United States Patent Office 3,237,163
Patented Feb. 22, 1966

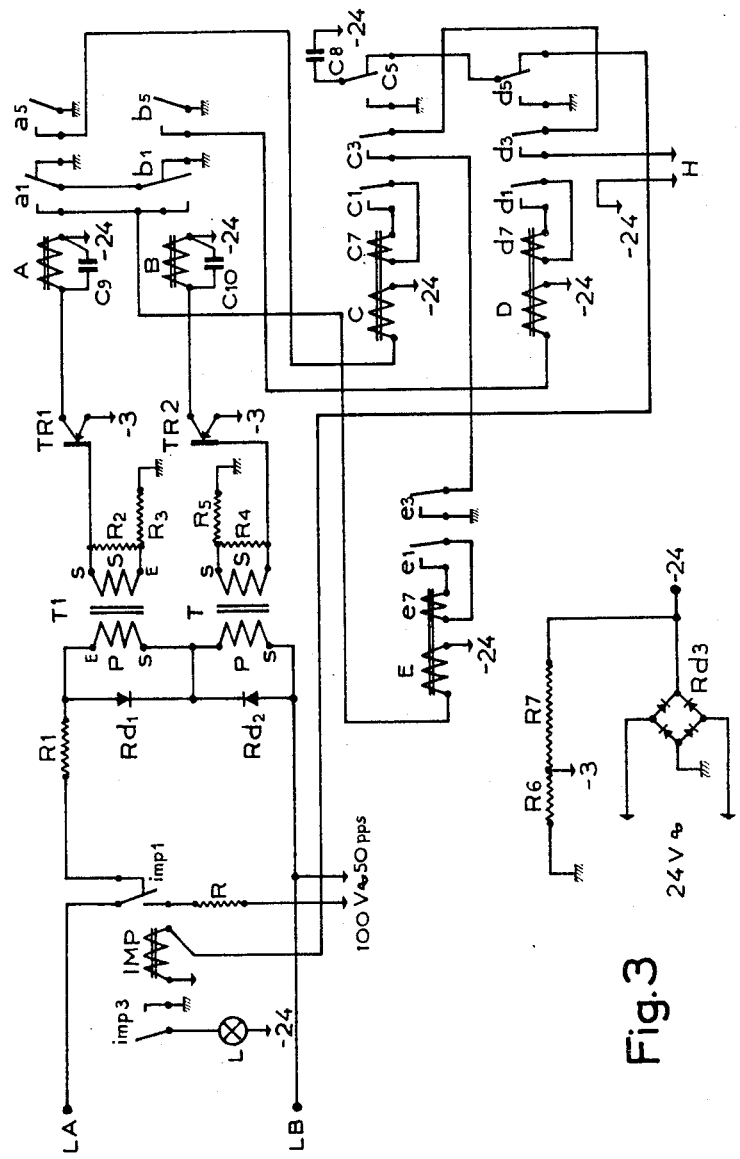

3,237,163
APPARATUS FOR TESTING CIRCUIT ELEMENTS IN A PULSE RESPONSIVE REMOTE CONTROL SYSTEM
Raymond Charles Voisin, 100 Ave. Daumesnil, Paris, France
Filed Jan. 17, 1961, Ser. No. 96,060
Claims priority, application France, Jan. 27, 1960, 816,860, Patent 1,250,795
3 Claims. (Cl. 340—147)

This invention relates to the testing of elements in tele-control network for controlling the operation of a device, both with and without the actuation of the device being controlled. Briefly, this is accomplished by separating the signal which actuates the device controlled by the network into two portions. Each of these signal portions is sent separately into the network to test the functioning of some of the elements of the network which operate to actuate the device only when both portions of the signal are sent at the same time.

One of the objects of this invention is to enable the checking of the whole tele-control network without tripping the principal effect; for this purpose the principal effect is only tripped when the entire signal is sent into the relays of the tele-control network.

Another object of this invention is to separate the signals producing the tripping of the principal effect into two parts.

Another object of this invention is to separately send each of the two parts of the signal into an electronic assembly.

Another object of the invention is to convert each of the signals to be sent into the line into short pulses so that the receiving equipment receives either negative pulses or positive pulses for the purpose of checking the proper working of the installation; or on the other hand, sending into the line alternating signals for tripping the principal effect.

Another object of the invention is to direct either the negative or the positive pulses into a part of the electronic assembly so as to check the assembly of this circuit without tripping the principal effect.

Another object of the invention is to send into the line, indicated by the Figures LA–LB, a return signal for acknowledging receipt and indicating proper functioning of the circuitry.

Other objects and advantages will be revealed in the following description and the attached drawings in which:

FIG. 2 shows the electric diagram of the signal receiving device;

FIG. 3 is an electric diagram for obtaining different feed voltages for the members.

Figure 1:
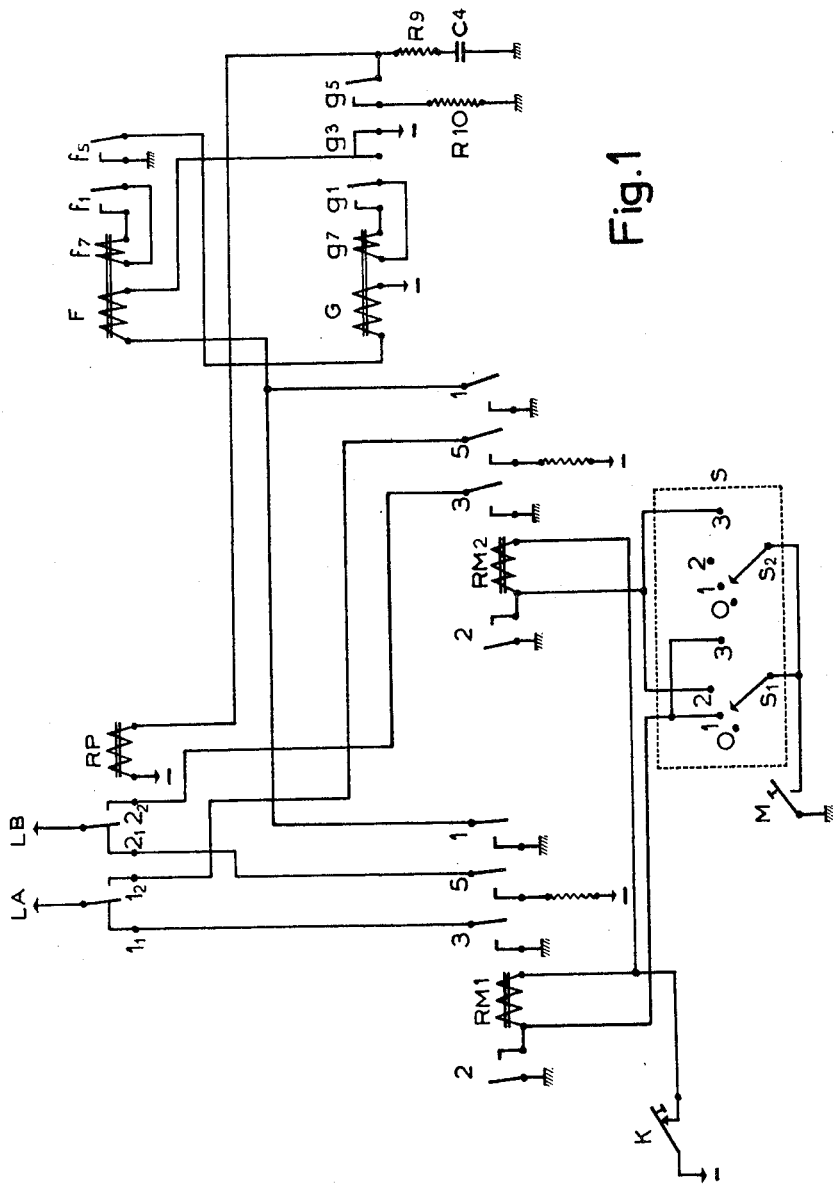
FIG. 1 shows the electric diagram of the signal transmitting device.

It is to be understood that all of the diagrams show the relays in a normally open condition.

The electric diagram for feeding the various members is shown by way of example in FIG. 3. This diagram consists of a dry rectifier $Rd3$ with open bridge permitting D.C. voltage to be obtained for feeding the various relays (for example at 25 v.) and a divisor bridge R6–R7 permitting polarized voltage on transistors of a negative 3 volts to be obtained.

It is to be understood that in the feed diagram shown in FIG. 3, the positive pole of the source is grounded.

The electric shown in FIG. 1 represents a device which permits sending into line LA–LB either pulses of positive currents for testing and checking one part of the device, or pulses of negative current for testing and controlling the other part of the device; or pulses of alternating positive and negative currents for the testing of the entire device and for tripping the principal effect.

This principal effect can, for example, be a siren. Consequently, one can, by carrying out the first two operations suggested by the last paragraph, check the proper working of the entire device while leaving the siren untripped.

The selection of signals sent to line LA–LB takes place from the switch S comprising switchblades $S_1$ and $S_2$ whose brushes are mechanically connected. Each of these switchblades $S_1$ and $S_2$ has four contacts which are noted by 0, 1, 2, 3 (see FIG. 1).

When the switch S is in the position 0, no effect occurs, due that the device is in the open position.

When the switch S is placed in position 1, a signal is selected for sending into the line LA–LB. This signal is positive on LA (contact $1_1$) and negative on LB (contact $2_1$). By pressing button M, the relay RM1 is supplied current. The circuit between ground and the negative pole of the supply circuit is closed by means of the button M, the switch $S_1$, the contact 1, the relay RM1 and the button K. As soon as relay RM1 is supplied with current, the contact 2 of this relay closes keeping relay RM1 connected even when the button M is no longer closed. To disconnect the relay RM1, it is only necessary to press button K.

The connection of the RM1 relay causes two effects. In the first place, by contacts 3 and 5, there is sent into line LA–LB a positive signal on LA and a negative on LB. Then, by contact 1 of relay RM1 this causes the connecting of relay F, the circuit between ground and negative pole of the battery being closed by contact 1 of the relay RM1, the coil of relay F and contact $g_3$ of relay G.

The relay F being closed, its contact $f_5$ closes the circuit of the relay G. However, when relay G closes its contact $g_3$ opens, which disconnects the coil of relay F, consequently disconnecting relay F. Relay F being disconnected, contact $f_5$ drops out, which disconnects the circuit of relay G. Consequently, the contact $g_3$ of relay G again closes and the circuit of relay F also closes, returning to its initial case.

The two relays F and G comprise an assembly where closing of one relay determines the opening of the other, and vice versa.

The relays F and G have windings $f_7$ and $g_7$ respectively. Thus, when contacts $F_1$ and $G_1$ are closed, they hold the corresponding relays F and G connected for a period of time after their supply current is disconnected.

The relay G has contact $g_5$ inserted in the supply circuit fo relay RP. Thus, successive connection of the relay G will determine the connecting, at the same frequency of relay RP.

Between ground and one of the contacts of $g_5$ of relay G there is placed in series resistance $R_9$ and condenser $C_4$, preventing sparks during the opening and closing of this contact $g_5$. A resistance $R_{10}$ is placed between the other contact of contact $g_5$ and ground.

By this device, periodical connecting and disconnecting of relay RP is obtained (for example at a frequency seven periods per second). This has the effect of sending into line LA–LB a series of positive pulses of gate form (positive on LA, negative on LB).

By placing switch S in position 2 one obtains the inverse actuation. After putting switch S ($S_1$) in position 2, and after pressing button M, the supply circuit on relay RM2 is closed.

The connection of relay RM2 has the effect:

(a) of closing the contact 2 insuring the connection of relay RM2 (the disconnection of this relay is caused by pressing Button A);

(b) of closing the contacts 3 and 5 of relay RM2, which sends into relay RP positive voltage on contact $1_2$ and negative voltage on contact $1_1$;

(c) of closing contact 1 of relay RM2, which produces the pulse beat of relays F and G, as set forth above in the description of the operation of relay RM1.

The beat of relays F and G determines the successive connections and disconnections of the relay RP, which, when this relay RP is connected, there is sent into line LA–LB a positive pulse on LB and a negative pulse on LA.

On the other hand, by putting in position 3 the switch S ($S_2$) relays RM1 and RM2 are simultaneously closed. This applies to positive voltage to contacts $1_1$ and $2_2$ of relay RP and negative voltage to the contacts $1_2$ and $2_1$. Thus, the successive connecting and disconnecting of relay RP (said connecting and disconnecting being caused by the beats of relays F and G) causes to be sent into line LA–LB:

(a) a positive pulse on LB and a negative pulse on LA when relay RP is connected;

(b) a positive pulse on LA and a negative pulse on LB when relay RP is disconnected.

In the receiving device shown in FIG. 2 the line LA–LB is closed initially on current limiting resistance $R_1$ (adjustable), and on the two primaries of transformers T and $T_1$ which are placed in series. The secondaries of each of the transformers T and $T_1$ are connected to the base of two transistors TR2 and TR1. The base of TR1 is connected to the output of secondary T and the base of TR2 is connected to the input of secondary $T_1$.

The inverse mounting would have the effect of causing only one transistor to be conductive at a given time according to the direction of the pulse. Thus, for example, for a positive pulse one makes transistor TR1 conductive and transistor TR2 a resistance, whereas, for the inverse pulse, one makes TR2 conductive and TR1 resistance.

In order to prevent inverse voltages produced by successive blocking and unblocking of one of the transistors acting on the other transistor resistance $R_4$ and $R_2$ are arranged in parallel on the secondaries of transformers T and $T_1$ while the resistances $R_5$ and $R_3$ are grounded. Likewise, rectifiers $Rd2$ and $Rd1$ are placed in opposition to each other in parallels on the primaries of transformers T and $T_1$.

Thus, when TR1 is released it will tend to produce an inverse voltage which is capable of releasing TR2. This inversible voltage will be first of all damped by the bridge $R_2$, $R_3$ and then shorted out by the rectifier $Rd2$ placed in parallel on the primary of transformer T.

In order that this shorting out of the primary of the transformers T and $T_1$ may be more efficacious the primary windings of these transformers should be purposely resistant.

When the transistor TR1 is conductive, a current which acts to close the relay A will be supplied between the transmitter of transistor TR1 (polarized for example at negative 3 volts) and the collector.

The closing of the relay A produces, by closing of its contact $a_1$ the supply to the coil of relay E. The supply circuit closes between ground and the negative pole of the battery by means of contact $b_1$ and relay $AB_1$, the contact $a_1$ of relay A, and the coil of the relay E. On the other hand, the closing of relay A causes by closing its contact $a_5$, the connection of relay C.

Thus, by sending into line LA–LB a string of positive pulses on LA the transistor TR1 is made conductive, the relay A beats, and the relays E and C are closed.

The relays E and C as well as relay D comprise coils $e_7$, $c_7$, and $d_7$ which, when the contacts $e_1$, $c_1$ and $d_1$ are closed insure the connection of these relays for a period of time after the supply of current is cut out.

The relays E, C and D also comprise contacts $e_3$, $c_3$, $d_3$ which are placed in series in the circuit causing the supply of current to relay H (not shown in FIG. 2). Consequently, relay H is connected and hence the principal effect (siren) is tripped, when these three relays E, C and D are connected.

The relays C and D also have contact $c_5$ and $d_5$ which when the relays C and D are normally open, connect one end of the condenser $C_8$ to the terminal of the relay IMP.

The operation of the device thus is as follows:

When positive pulses are sent into line LA, the transistor TR1 is made conductive and connects at the frequency of the pulses the relay A. This relay causes the closing of relays E and C. The relay C being connected, its contact $c_5$ bridges the condenser $C_8$ between ground and the negative pole of the supply current (a negative 24 volts), thus charging the condenser $C_8$ at this voltage. When the pulse train ceases, the relays A, E and C drop out which causes contact $c_5$ to drop out. At this moment, condenser $C_8$ previously charged is connected to relay IMP connecting and discharging it.

Relay IMP being connected contact $imp_3$ closes and connects lamp L, lighting it, while the relays contact $imp_1$ causes an alternating voltage for example at 100 volts 50 c.p.s. to be sent into line LA–LB. This alternating voltage is then received in the pulsed transmitter equipment showing that the receiving apparatus is working correctly.

On the other hand, when a positive signal is sent into a line LB, transistor TR2 becomes conductive periodically connecting relay B.

In their turn, the beats of relay B cause the connecting of relays D and E by their contacts $b_1$ and $b_5$. When the relay D is connected its contact $d_5$ charges condenser $C_8$, so that when relay D drops out, the condenser $C_8$ also discharges into the relay IMP so as to connect it. The connecting of relay IMP lights lamp L and sends into line LA–LB an alternating voltage acting to acknowledge receipt.

When the entire current (alternating pulses positive and negative current) is sent into the line LA–LB, position 3 of switch S, an alternating beat of relays A and B is caused. These two relays, A and B then actuate the relays C, D and E, so as to connect them.

These three relays C, D, and E being connected, contact $e_3$, $c_3$ and $d_3$ and relay H are fed with current, consequently causing the tripping of the principal effect, the siren. Resulting from this description are the two cases which are to be considered in the operation of the device:

(1) The electric tests of the tele-control network;
(2) The tripping of the principal effect.

For the electric tests of the tele-control network, initially only positive pulses are sent which control the circuit including transformer $T_1$, transistor TR1 and relays A and C. Subsequently, only negative pulses are sent so as to check the circuit including transformer T, transistor TR2 and relays B and D.

By sending the aforementioned two kinds of pulses to the receiver, the receiving members of the tele-control network are checked by means of the auxiliary circuit including relay IMP which sends to through line LA–LB a short train of current alternating at 50 c.p.s.

The operation of the auxiliary circuit occurs when relays C and D drop out, causing the discharge of condenser $C_8$ into the coil of relay IMP. In order to trip the principal effect it is necessary to supply the entire current (positive and negative pulses) to line LA–LB, which alternately closes relays A and B. Then, the relays C, D and E connect and close the circuit of relay H. The relay H, is for example a mercury relay controlling the starting of the tele-control motor.

Owing to its construction, this device protects the system against the eventuality of connection of circuit with foreign currents.

In the first place, the transformers T and $t_1$ insulate the device from D.C. current.

Then in the event of the accidental contact with an automatic telephone line capable of transmitting pulses initiated by dials only a part of the system is actuated (according to the polarity of the pulses sent by the accidental contact). The principal effect cannot be tripped.

The device is also protected against the eventuality of connection with an industrial current source, because, in this case, relay E intervenes. In fact, with a current which the frequency exceeds 20 c.p.s., relays A and B no longer work alternately, owing to the time-lag caused by the connection of condensers $C_9$ and $C_{10}$ mounted in parallel on the coils of relays A and B.

These two relays A and B, thus work simultaneously, and there contacts $a_1$ and $b_1$ cut out the circuit of relay C. Since relay C is disconnected, it is impossible to trip the control motor to trip the principal effect.

Obviously the invention is not limited to the examples shown in the embodiment described herein and shown in the accompanying drawings, but the measure of my invention is in the claims. If necessary recourse may be had to other methods and other forms of embodiment without going outside the scope of the invention as defined by the claims. In particular the signals conveyed to the receiving member can be amplified by tubes instead of transistors.

I claim:

1. Apparatus for control of a remote device comprising a single generator including a source of electric current, a first relay means and a second relay means, a control relay responsive to said first and second relay means, a switch for selectively sending signals from said current source individually through said first relay means and said second relay means and simultaneously through both said relay means; a remote control apparatus operable to actuate said remote device; control lines interconnecting said control relay and said remote control apparatus; said switch being operable in one position to cause said first relay means to produce a pulse of predetermined polarity to operate said control relay and cause said control relay to send a pulse of similar polarity into said control lines, said switch being operable in a second position to cause said second relay means to produce a pulse of opposite polarity from that of said first relay means to operate said control relay and cause said control relay to send through said control lines a pulse of said opposite polarity, said switch being operable in a third position to operate both of said relay means to operate said control relay to alternately send pulses of opposite polarity through said control lines, said alternating pulses of opposite polarity being operable to cause said remote control apparatus to actuate said remote device.

2. Apparatus for control of a remote device comprising an electric signal generator having pulse producing means and polarity selecting means, control apparatus operable to actuate said remote device, control lines interconnecting said signal generator and said control apparatus, said pulse producing means producing polarized pulses, said polarity control means being operable in a first condition to supply pulses of one polarity to said control lines, said polarity control means being operable in a second condition to supply pulses of opposite polarity to said control lines, said polarity control means being operable in a third condition to supply pulses of alternating polarity to said control lines, said control apparatus having first and second signal receiving means, said first signal receiving means being operable by pulses of said one polarity and said second signal receiving means being operable by pulses of said opposite polarity, and means responsive to simultaneous operation of said first and second signal receiving means responsive to pulses of alternating polarity to actuate said remote device.

3. Apparatus for control of a remote device comprising an electric signal generator having pulse producing means and polarity control means, control apparatus operable to actuate said remote device, control lines interconnecting said signal generator and said control apparatus, said pulse producing means producing polarized pulses, said polarity control means being operable in a first condition to supply pulses of one polarity to said control lines, said polarity control means being operable in a second condition to supply pulses of opposite polarity to said control lines, said polarity control means being operable in a third condition to supply pulses of alternating polarity to said control lines, said control apparatus having first and second signal receiving means, said first signal receiving means being operable by pulses of said one polarity and said second signal receiving means being operable by pulses of said opposite polarity, means responsive to simultaneous operation of said first and second signal receiving means responsive to pulses of alternating polarity to actuate said remote device, and answer back means response to operation of said first and second signal receiving means individually to determine operability of said control apparatus.

References Cited by the Examiner

UNITED STATES PATENTS

| | | | |
|---|---|---|---|
| 381,896 | 4/1888 | Young | 324—73 |
| 1,672,005 | 6/1928 | Sorensen | 340—147 |
| 1,923,724 | 8/1933 | Griffith | 178—4.3 |
| 2,235,755 | 3/1941 | Bakker et al. | 178—69 |
| 2,363,061 | 11/1944 | Harrington | 340—176 |
| 2,512,639 | 6/1950 | Gohorel | 340—147 |
| 2,545,551 | 3/1951 | Koch | 324—73 |
| 3,021,506 | 2/1962 | Haver et al. | 340—147 |

NEIL C. READ, *Primary Examiner.*

L. McCOLLUM, G. S. KINDNESS, H. PITTS,
*Examiners.*